United States Patent [19]

Wiman

[11] Patent Number: 4,572,042
[45] Date of Patent: Feb. 25, 1986

[54] CUTTING INSERT

[75] Inventor: Jörgen V. Wiman, Sandviken, Sweden

[73] Assignee: Santrade Limited, Lucerne, Switzerland

[21] Appl. No.: 624,734

[22] Filed: Jun. 26, 1984

[30] Foreign Application Priority Data

Jun. 27, 1983 [SE] Sweden ............................. 8303657

[51] Int. Cl.[4] ........................... B23B 1/00; B26D 1/00
[52] U.S. Cl. ..................................... 82/1 C; 407/113; 407/114; 407/120
[58] Field of Search .................. 82/1 C; 407/113, 114, 407/120

[56] References Cited

U.S. PATENT DOCUMENTS

| 3,314,126 | 4/1967 | Stier | 407/105 |
|---|---|---|---|
| 3,316,616 | 5/1967 | Milewski | 407/105 |
| 3,848,303 | 11/1974 | Faber | 407/114 |
| 4,084,917 | 4/1978 | Stumpp | 407/114 |
| 4,278,369 | 7/1981 | Jakobs et al. | 407/114 |

FOREIGN PATENT DOCUMENTS

| 43-269 | 1/1969 | Japan | 407/114 |
|---|---|---|---|
| 101786 | 8/1977 | Japan . | |
| 2095140 | 7/1982 | United Kingdom | 407/113 |

Primary Examiner—Leonidas Vlachos
Attorney, Agent, or Firm—Burns, Doane, Swecker & Mathis

[57] ABSTRACT

The present invention relates to a cutting insert (11) for length turning, inwards turning and outwards transversal turning having a generally rhombic or triangular basic form with a cutting edge (14), a cutting edge (15) and a transversal turning edge (18). The transversal turning edge (18) is arranged to cut and break coarse but short chips (21) and the cutting edge (14) is at the same time arranged to cut fine and continuous chips (22) to obtain a good surface fineness during the transversal turning operation.

14 Claims, 7 Drawing Figures

{ 4,572,042 }

CUTTING INSERT

BACKGROUND AND OBJECTS OF THE INVENTION

The present invention relates to a cutting insert for use in a turning machine. The insert having generally a rhombic or triangular basic form has at least one cutting tip that is formed by converging cutting edges with a cutting tip angle below 90°. The insert is provided with portions that form edges for use in transversal turning.

In numerically controlled production it is of great importance at turning that the chips disappear from the cutting area. Hitherto known inserts for transversal turning give a continuous, coarse and strip-shaped chip which means that the chip easily may be wound around the work piece.

The automatic measuring apparatus that checks the dimension of the work piece will thus be hindered by the wound chip so that it gives false measurement test results and so that the devices for picking the work piece will not function satisfactorily. The chip entanglement occurring during turning of the work piece with conventional cutting inserts may also cause damage to the work piece, the tool and possibly to the operator.

The object of the present invention is to present a cutting insert for continuous length-turning, inwards turning and transversal turning that solves the above-mentioned problems.

THE DRAWINGS

In the following the invention will be described in connection with the attached drawings in which FIG. 1 shows a top view of a cutting insert according to the present invention in different machining operations, FIG. 2 shows an enlarged top view of the cutting insert at transversal turning of a work piece, and FIGS. 3-7 show alternative shapings of cutting inserts according to the invention.

DETAILED DESCRIPTION OF PREFERRED EMBODIMENTS OF THE INVENTION

Figure 1:
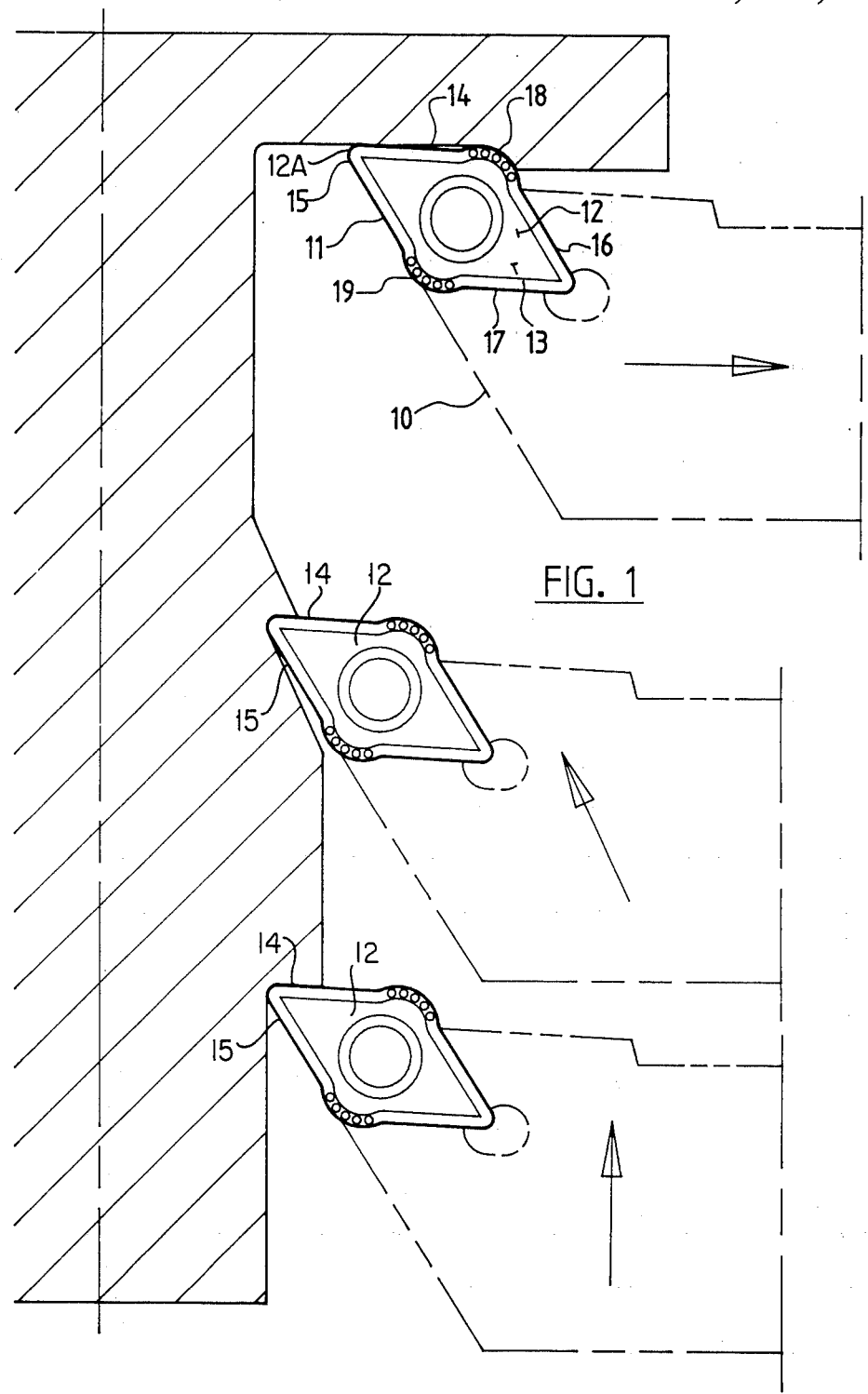

FIG. 1 shows the cutting tool in three machining operations; length-turning at A, inwards turning at B, and outwards transversal turning at C with feeding directions according to the arrows in FIG. 1. Only the outwards transversal turning will be described hereinafter because that operation is the one causing the most problems in turning with conventional inserts. The cutting tool includes a partially shown insert holder 10 provided with an insert site to receive a cutting insert 11 according to the present invention. The insert 11 has a rhombic basic form with major surfaces 12,13 that are substantially parallel and that are perpendicular to the minor surfaces. The junctions between the major and minor surfaces define two pairs of converging cutting edges 14, 15 and 16,17. The edges 14,16 and 15,17, seen in a top view, are separated from each other by the protruding portions 18,19, which are symmetrically arranged around the main diagonal and around the minor diagonal. The cutting edge 14, the connected portion 18 and the cutting edge 15 are placed outside the insert site of the insert holder 10. The portions 18, 19 are arranged at the remote end of each cutting edge, i.e. the end that is turned away from the nose or tip 12A of the insert. The rhombic configuration is provided with four insert edge lengths and the portion 18 may alternatively be placed somewhere between said remote end and the midpoint of such a length so that the two (coarse and fine) chip generating places (see FIG. 2) will not be too near each other which could result in chip entanglement. The periphery of the insert is provided with a groove and recesses in order to obtain a positive cutting geometry.

Figure 2:
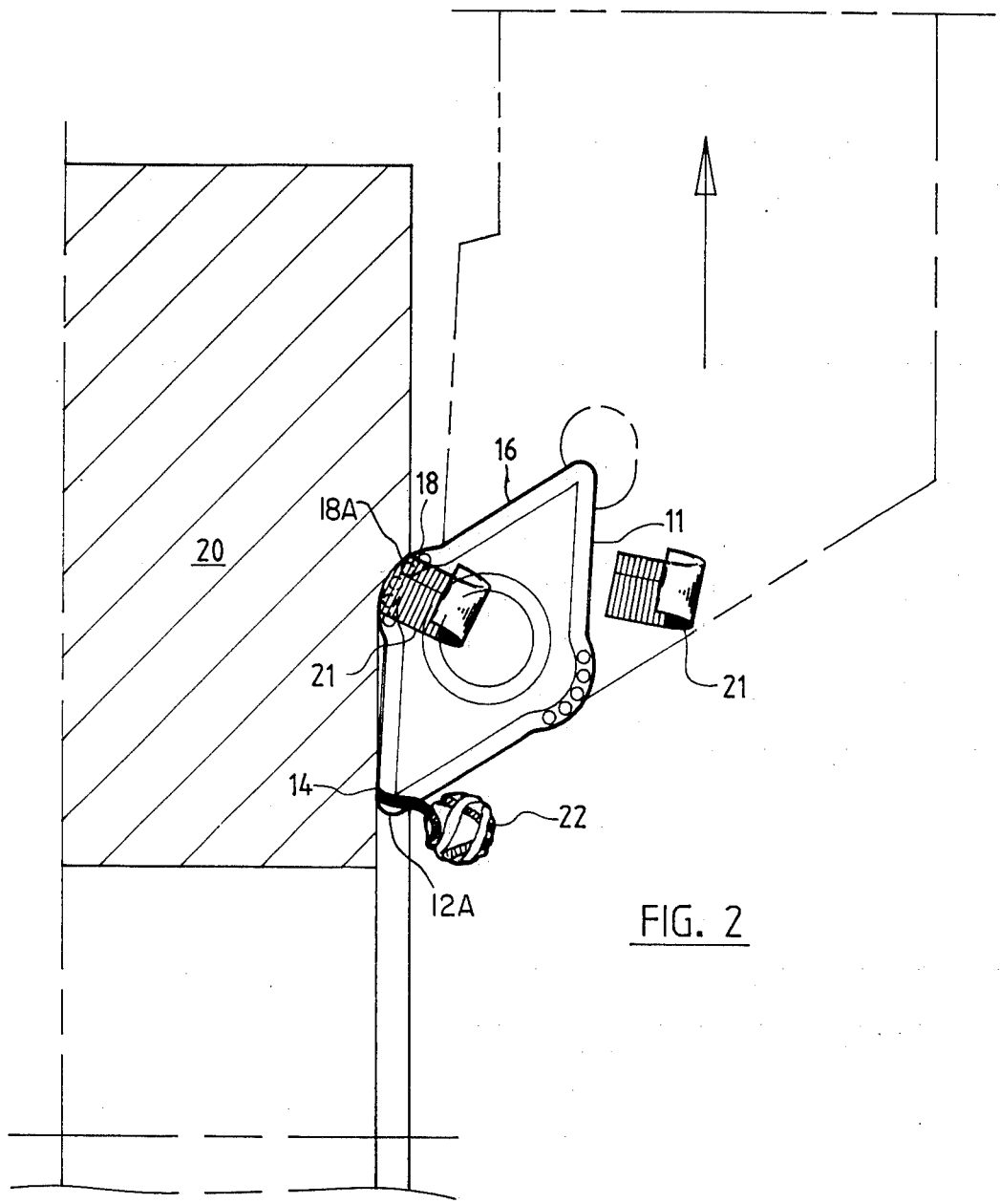

FIG. 2 shows the insert 11 in a transversal turning operation against a segment of the end of a thickwalled pipe 20. The feeding direction of the insert is illustrated by an arrow in the figure whereby the portion 18 leads the nose 15A. The portion 18 protruding outside the obtuse-angled corner in the rhombic configuration, has a circular and convex form that reaches from one cutting edge 14 to another 16. The object of the portion 18 is to cut the main part of the material that is to disappear as chips. Thus, the transversal turning portion 18 has a transverse cutter edge section 18A that faces away from the nose 12A and cuts a coarse chip 21 whereafter it is being bent and finally broken either as a result of the deformation that the chip is exposed to or because of the tensions that occur when it hits the tool or the work piece 20. Such a chip 21 is shown to the right in the figure on its way from the chip generating area. The chip 21 is shorter and therefore it can not cause any chip entanglement. The cutting edge 14 will then follow the portion 18 in the feeding direction and a portion thereof disposed adjacent the nose 12A will cut fine chips near the nose of the insert. The chip 22 being generated by the cutting edge 14, is very thin due to the small cutting depth and therefore the surface of the work piece 20 will obtain an excellent fineness. The thin chip will wind itself to a ball near the cutting area. Such a chip will not cause any chip entanglement and it will break at low load.

Figure 3:
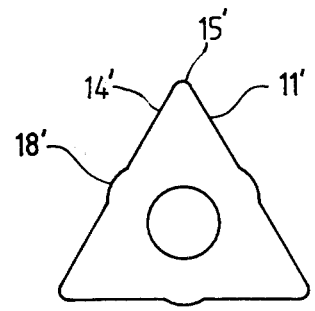
Figure 4:
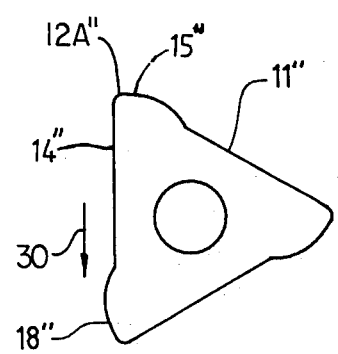

FIGS. 3 and 4 show alternative shapings of cutting inserts according to the invention wherein the inserts essentially have triangular basic forms. In FIG. 3 the protruding portion 18' is placed about the middle of the distance between two nose parts of the insert 11' and therefore it is possible to use four additional edges for outwards machining relative to the first mentioned cutting insert. In FIG. 4 the triangular insert 11" is provided with an arched or protruding portion 18" adjacent each cutting corner which results in a good surface fineness on the work piece at both length-turning and transversal turning. The outermost point of the arched portion 18" is arranged at a larger distance from the centre of the insert 11" than the intersection between the inner normal of a tangent in said point and an extension of the cutting edge 14". Alternatively the portion 18" may have a somewhat straighter shape because this is advantageous at high feeding rates at length-turning resulting in an excellent surface smoothness whilst the insert 11" also gives an advantageous transversal turning.

When the insert of FIG. 4 is fed in direction 30 in a transversal turning operation, the protruding portion 18" disposed at the bottom of FIG. 4 will lead the nose 12A" of the insert formed at the other end of edge 14" by the edges 14" and 15".

Figure 5:
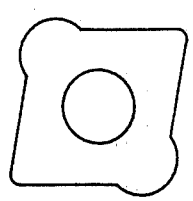
Figure 6:
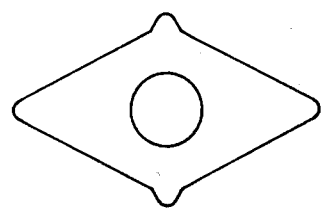
Figure 7:
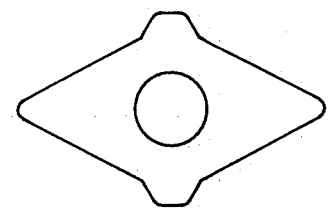

FIGS. 5-7 show alternative cutting insert shapes according to the invention. These inserts are essentially rhombic wherein the portions are partly circular, U-formed or trapezi-formed, respectively. The insert of FIG. 5 differs from the insert of FIG. 1 or 2 only in that it has larger acute angles and lesser obtuse angles and, therefore, it is adapted to cut deep into the work piece at length-turning. In FIG. 6 is shown an insert having transversal turning edges adapted to cut a little cutting depth at transversal turning, that is especially suitable for work pieces with fine dimensions, such as a pipe flange. The radius of the transversal cutter edge has about the same size as the radius of the nose in the acute-angled corner. The insert in FIG. 7 having a transversal turning edge with two radii, is an example of an insert for cutting depths somewhere between the ones for the inserts in FIGS. 1 and 2 and in FIG. 6. A suitable interval for the relation between the radius of the transversal turning edge and the radius of the acute-angled nose part is between 0.1 to 10, preferably 1 to 4.

The present invention is not limited to the above described and in the figures shown preferred embodiments. Thus the basic forms of the inserts and the shape of the transversal turning edge may be altered according to the specific demands of the machining. The cutting surfaces of the inserts may also be provided with recesses, grooves and protuberances within the scope of the claims.

I claim:

1. A cutting insert adapted for length turning, inwards turning, and transversal turning operations, said insert comprising:
   a body having a pair of cutting edges converging at an angle less than ninety degrees to form a cutting nose for performing a cutting operation during length turning and inwards turning operations, and
   a protruding cutter portion situated at an end of at least one of said converging cutting edges and protruding transversely beyond a plane containing said at least one converging cutting edge, said protruding portion forming a transverse cutter edge, at least a section of which faces away from said nose to cut coarse and short chips during a transversal turning operation wherein said protruding portion leads said cutting nose, and a portion of said at least one cutting edge disposed adjacent said cutting nose cuts finishing chips.

2. A cutting insert according to claim 1, wherein said protruding cutter portion is spaced from said nose by at least half the length of said at least one cutting edge.

3. A cutting isnert according to claim 1, wherein said cutter edge of said protruding portion is convexly curved.

4. A cutting insert according to claim 3, wherein said converging cutting edges are each continuously straight.

5. A cutting insert according to claim 1, wherein said insert is of rhombic shape having two acute-angled cutting noses mutually opposed along a major diagonal of said insert, said noses formed by two pairs of said converging cutting edges, and two protruding cutter portions mutually opposed along a minor diagonal of said insert such that each protruding cutter portion separates a cutting edge of one of said pairs from a cutting edge of another of said pairs, each said protruding cutter portion projecting transversely beyond planes containing said cutting edges separated by such protruding cutter portion.

6. A cutting insert according to claim 1, wherein said cutter edge of said protruding cutter portion comprises a circular segment having a radius which is in the range of from 0.1 to 10 times a radius of said nose.

7. A cutting insert according to claim 6, wherein said range is from 1 to 4.

8. A cutting insert according to claim 1, wherein said cutter edge of said protruding portion is shaped as a segment of an ellipse.

9. A cutting insert according to claim 1, wherein said cutter edge of said protruding cutter portion is shaped as a segment of a trapezoid.

10. A cutting insert according to claim 1, wherein said cutter edge of said projecting portion is shaped as a segment of a circle.

11. A cutting insert according to claim 1, wherein said insert is triangularly-shaped, to define three noses, there being three said projecting portions each situated midway between adjacent noses.

12. A cutting insert according to claim 1, wherein said insert includes chipbreaker means.

13. A cutting insert according to claim 12, wherein said chipbreaker means comprises a groove spaced adjacent each of said converging cutting edges, and further comprises recesses spaced adjacent said cutter edge of said projecting portion.

14. A method of performing a transversal turning operation on a workpiece by means of an insert which comprises a body having a pair of cutting edges converging at an angle less than ninety degrees to form a cutting nose, and a protruding cutter portion situated at an end of at least one of said cutting edges and protruding transversely beyond a plane containing said at least one converging cutting edge, said protruding portion forming a transverse cutter edge, a section of which faces away from said nose, said method comprising the step of relatively moving said insert and said workpiece such that said protruding cutter portion leads said cutting nose and said transverse cutter edge cuts coarse and short chips and a portion of said at least one cutting edge disposed adjacent said nose cuts finishing chips.

* * * * *